(No Model.)
S. H. SHORT.
CONTROLLING DYNAMO ELECTRIC MACHINES FOR ELECTRIC RAILWAYS.
No. 458,956. Patented Sept. 1, 1891.
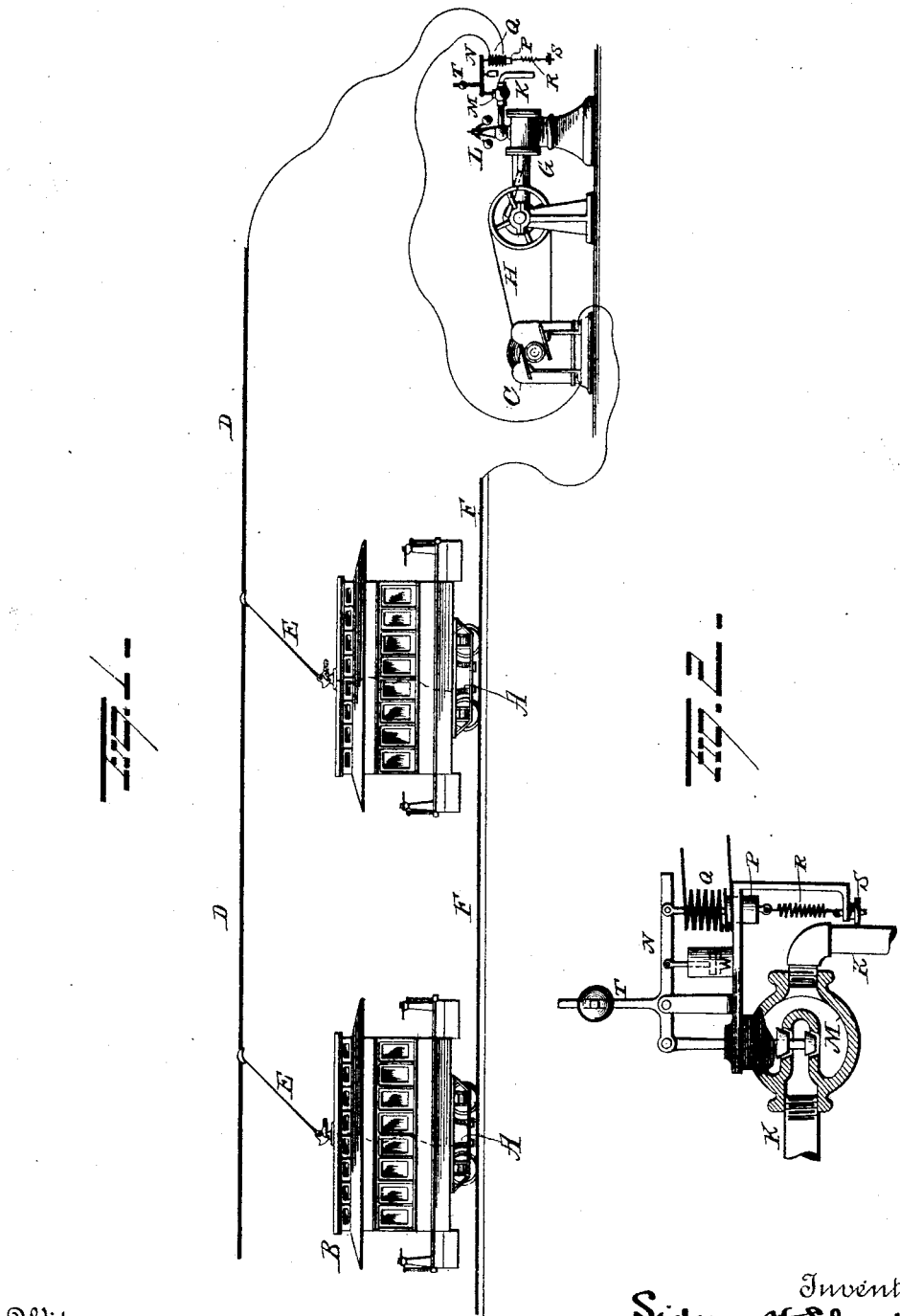
Witnesses
G. F. Downing
S. Y. Nottingham
Inventor
Sidney H. Short.
By his Attorney

UNITED STATES PATENT OFFICE.

SIDNEY H. SHORT, OF CLEVELAND, OHIO, ASSIGNOR TO THE SHORT ELECTRIC RAILWAY COMPANY, OF SAME PLACE.

CONTROLLING DYNAMO-ELECTRIC MACHINES FOR ELECTRIC RAILWAYS.

SPECIFICATION forming part of Letters Patent No. 458,956, dated September 1, 1891.

Application filed April 30, 1890. Serial No. 350,021. (No model.)

*To all whom it may concern:*

Be it known that I, SIDNEY H. SHORT, of Cleveland, in the county of Cuyahoga and State of Ohio, have invented certain new and useful Improvements in Controlling the Dynamo-Electric Generators of Railways and other Electrical Systems; and I do hereby declare the following to be a full, clear, and exact description of the invention, such as will enable others skilled in the art to which it appertains to make and use the same.

This invention relates more particularly to automatic controlling means for preventing the overloading of the dynamo-electric generators in electric railways, wherein the motors on the different electrically-propelled vehicles are arranged abreast of or in multiple arc with one another; but the improvements constituting said invention are of course severally included for all the uses to which they may respectively be applicable. In this class of railways there is danger, should the generator become overloaded and the speed of the generator or the same conditions of generation continue, that an excessive current would be generated, which would be apt to destroy the insulation through the great heat produced.

In accordance with the present invention an electrically-operated appliance or appliances is employed which responds when the current assumes an abnormal strength to shut off the supply of fluid to the steam-engine or other prime motor which drives the generator or otherwise to stop or slow down the said generator, or still more generally to reduce or cut down the current generated, under which expression, as used herein, is included the prevention of further increase of said current, as well as an actual diminution of its strength. Heretofore a variety of appliances have been employed in other connections which are operated electrically, the most ordinary form of such means being an axial electric magnet or solenoid having a movable core and retractor, which core is connected with the means for controlling the current. In the present invention it is preferred to employ a solenoid with its core and retractor, and such appliance is specially included as an element of the new combinations of this invention; yet the latter extends also to combinations comprising, generally, electro-magnets with movable armatures and retractors or retainers and (still more broadly) electrically-operated appliances in general. Heretofore, also, a variety of means have been employed in other connection for cutting down the current of a dynamo, such as a valve in the feed-pipe or steam-supply pipe of the engine constituting the prime motor, or a shifting-belt or cone-pulleys between the prime motor and the generator, or devices which lessen the strength of field of the generator, and so on, the valve in the steam-supply pipe being a very common means. In the present invention it is preferred to employ a feed-valve for the prime motor in order to cut down the current by so choking or cutting off the supply of steam or other fluid as to reduce the speed of the prime motor, and consequently that of the generator also, and such means is specially included as an element of the new combinations of this invention; yet the latter extends also to combinations comprising, generally, means to slow down or stop the generator and (still more broadly) means in general to reduce or cut down the current. Heretofore, also, a variety of connections have been employed between the electrically-operated appliances and the current-reducing means, the connection in some cases being direct, so that the force of the current acting on said appliance imparts the requisite movement to the means to cut down the current and in others indirect, the said appliance bringing some other motor mechanism into play which shifts the said current-reducing means. In the present invention it is preferred to employ a direct connection, and this is specially included in the invention, which extends, however, also to the new combinations with suitable connections in general between the electrically-operated appliance and the current-reducing means. The said electrically-operated appliance is placed in series with the motor either in the main line or in a suitable shunt on such line, so that it is exposed to the full current of the machine or to a current which corresponds therewith, and it is so adjusted that it does not prevent the requisite variations in the current necessary to supply the motors of a greater or less number of vehicles on the road or of vehicles under the varying conditions which they meet with in passing over the road, but does respond to an abnormal current in the direction to reduce or cut down such current. This combination of a properly-adjusted current-controller operated electrically in series with the translating devices, which latter are in multiple arc with reference to each other, is believed to be new not only in electric railways, but also for translating devices in general, and the invention, while it specially covers the combination with electrically-propelled vehicles, extends also thereto with motors or electro-dynamic machines generally, or, still more broadly, to translating devices in general. The expression "multiple arc" as used herein is to be understood as including a multiple series. It is also believed to be new generally to provide an automatic controller to prevent overloading of a dynamo.

In connection with the generator for supplying the current to the translating devices in multiple arc a speed-governor or current-regulator is employed to maintain the electro-motive force constant within appropriate limits. A centrifugal governor for the prime motor is preferred; but other speed-governors or current-regulators, of which a number have been devised, may be used.

The generator may of course be driven by a prime motor of any suitable description. It is preferred, however, to employ an engine about the same capacity as the generator, or, in other words, sufficient to drive the generating dynamo at its normal speed when fully loaded, so that should the dynamo become overloaded the overloading of the engine at the same time favors the reduction of the speed, and consequently also of the electro-motive force of the dynamo. The electrically-operated appliance, (or appliances,) the current-reducing means, and the connection of said appliance with the said means may, as already stated, be of any suitable description. A special improvement consists in the application of a controller in which the current-reducing means are automatically restored or are operated automatically in the opposite sense on the cessation of the abnormal current, thus causing only temporary interference with the normal workings.

For further improving the operation of the controller one or more instrumentalities are employed which favor a quicker action of the speed or current reducing means in the direction to cut down the speed or current than in the direction to restore the same, said instrumentality operating to accelerate the movement of reduction or to check the return movement, or in both ways. Heretofore in other connections a variety of such accelerating or retarding instrumentalities have been employed. The present invention, while it extends also to such instrumentalities in general, includes specially an upright weighted lever-arm for accelerating the movement of reduction and a properly-arranged dash-pot to check the return movement or to assist the weighted arm in checking it.

In the accompanying drawings, which form part of this specification, Figure 1 is a diagram illustrating a section of an electric railway provided with the present invention, and Fig. 2 is a detail view on a larger scale of the electrically-operated controller.

As shown, the motors A on the cars or electrically-propelled vehicles B are supplied with current from the dynamo-electric generator C through the overhead conductor D and pole-trolleys E, which current, after traversing the motors A, passes by the wheel-base of the vehicles to the rails F and ground and then returns to the generator C. Other modes of supplying current to the motors may of course be used. The motors A of different vehicles, it will be observed, are in multiple arc, and the illustration is designed simply to exhibit by way of example one form of electric railway having the motors of electrically-propelled vehicles connected with the supply-circuit abreast of or in multiple arc with one another.

The prime motor for driving the electrical generator is, as shown, a steam-engine G, from which the dynamo C is driven through the belt H. The steam-engine G is supplied with steam through the pipe K. The engine is of about the capacity requisite to drive the electrical generator C at its normal speed when fully loaded, or it may be in excess of this capacity, if desired. The engine is shown as provided with a centrifugal governor L for maintaining constant the speed of the engine and dynamo, which governor may control a throttle-valve or a variable cut-off, or otherwise regulate the supply of steam to the engine. By keeping the speed constant the electro-motive force of the generator C will be regulated within the desired limits, (supposing an appropriate dynamo be employed, as understood by those skilled in the art,) and instead of the centrifugal governor other speed-governors or other regulators may be used.

The controller for preventing abnormal current from overloading comprises, as shown, a normally-open balanced valve M (or feed-valve) in the steam-supply or feed pipe K. By closing this valve in whole or part it cuts off the whole or a part of the steam-supply, with the result of slackening the speed of the engine G (or prime motor) and the dynamo C, and consequently also the reduction of the electro-motive force of said dynamo and of the current generated thereby. The valve M being normally open, gives a full head of steam, whose admission to the engine, as required by the variations within the normal load on the dynamo, is regulated by the governor L. The valve M (constituting, as shown, the current-reducing means of the controller) is connected by the lever N with the movable armature in the form of a core P of the electromagnet or solenoid Q, which is electrically connected in series with the motors A, so as to exert on the core P an attractive force, which varies with the current generated by the dynamo. The core P is held back against the attraction by the retainer R, in the form, as shown, of a spiral tension-spring connected at one end with the core P and at the other with an adjustable tightener S, in the form of a screw-threaded rod extending through a stationary bracket-arm and provided with a nut on the end. The force of the retainer or spring R is so adjusted that it resists the attraction of the electro-magnet or solenoid Q so long as the current varies within normal limits, but yields and allows the attraction to move the core P and close the valve M so soon as an abnormal or dangerous current is generated. This shutting off of the steam causes the engine to slow down or to stop, thus rendering the dynamo C incapable of keeping up the heavy flow of current and preventing the injury that might arise from it.

The connection of the valve (or current-reducer) M with the core P is, as shown, such that when the excessively heavy current, and consequently the abnormal attraction, also, of the solenoid Q, ceases the said valve is opened again or restored by the action of the spring R acting as a retractor.

In order to accelerate the movement of the valve M for reducing an abnormal or dangerous current, the upright weighted arm T is provided on the lever N above the fulcrum. As said lever is turned to close the valve M, the weighted arm T is moved beyond the fulcrum and its pressure is added to the attraction of the solenoid Q. When the valve is closed, the weight on said arm of course resists the force of the retractor R and delays the opening of said valve. To further check the opening of the valve, (or return of the current-reducer,) a dash-pot W is connected with the lever N, which will check the rapid opening but not the rapid closing of the valve M.

Although the controller for reducing abnormal currents is mainly designed for use in combination with translating devices in multiple arc, yet all my claims are not restricted to a multiple-arc system.

Having fully described my invention, what I claim as new, and desire to secure by Letters Patent, is—

1. In combination with the prime motor, dynamo-electrical generator, and supply-circuit of an electric railway and electrically-propelled vehicles having their propelling-motors connected in said supply-circuit in multiple arc, a controller for preventing the production of abnormal currents through overloading, the same comprising an electrically-operated appliance in series with said propelling-motors, adjusted to respond to said abnormal currents and connected with current-reducing means, substantially as described.

2. In combination with the prime motor, dynamo-electric generator, and supply-circuit of an electric railway and electrically-propelled vehicles having their propelling-motors connected in said circuit in multiple arc, a controller comprising an electro-magnet or solenoid arranged in series with said propelling-motors and provided with a movable armature or core, and a retainer adjusted to permit said armature or core to move under the influence of an abnormal current, and a valve in the feed-pipe of said prime motor whose position is controlled by said armature or core, substantially as described.

3. In combination with the prime motor, dynamo-electric generator, and supply-circuit of an electric railway and electrically-propelled vehicles having their propelling-motors connected in said circuit in multiple arc, a controller adjusted to respond to abnormal currents and comprising an electro-magnet in series with said propelling-motors, with its movable armature directly connected with current-reducing means, such as a valve in the feed-pipe of the said prime motor, substantially as described.

4. The combination, with a prime motor and a dynamo-electric generator, of a governor for normal working and a controller comprising an electrically-operated appliance adjusted to respond to predetermined abnormally-heavy currents and connected with current-reducing means, substantially as described.

5. The combination, with a prime motor and a dynamo-electric generator, of a speed-governor adjusted to regulate the feed of said prime motor for normal working and a controller comprising an electrically-operated appliance adjusted to respond to predetermined abnormally-heavy currents to reduce the said feed, substantially as described.

6. The combination, with a prime motor, a dynamo-electric generator, an electric circuit, and electric motors or translating devices in multiple arc in said circuit, of a controller for abnormal currents, having its electrically-operated appliance in series with the said motors or translating devices, and a governor or regulator adjusted for working under normal loads, substantially as described.

7. The combination of a prime motor, a dynamo-electric generator, an electric-railway circuit, electrically-propelled vehicles having their propelling-motors in multiple arc in said circuit, the controller for abnormal currents having its electrically-operated appliance in series with said propelling-motors, and a governor whereby normally the speed of said generator is maintained, substantially as described.

8. The combination of a steam-engine or prime motor, a dynamo-electric generator, an electric circuit, electric motors or translating devices in multiple arc in said circuit, a controller for abnormal currents, comprising a valve in the feed-pipe of said engine or prime motor and an electrically-operated appliance in series with said motors or translating devices connected with said valve, and a speed-governor normally controlling the feed of said prime motor, substantially as described.

9. The combination of a dynamo-electric generator, a driving-engine of nearly the same capacity as said generator, and a controller comprising an electrically-operated appliance in the circuit of said generator and a valve in the feed-pipe of said engine, substantially as described.

10. The combination of a dynamo-electric generator, a driving-engine of nearly the same capacity as said generator, an electric circuit, electric motors or translating devices in multiple arc in said circuit, and a controller comprising an electrically-operated appliance in series with said motors or translating devices and a valve in the feed-pipe of said engine, substantially as described.

11. The combination of a dynamo-electric generator, a driving-engine of nearly the same capacity as said generator, an electric circuit, electric motors or translating devices in multiple arc in said circuit, a controller comprising an electrically-operated appliance in series with said motors or translating devices and a valve in the feed-pipe of said engine, and a speed-governor whereby normally the admission of steam to said engine is regulated, substantially as described.

12. The combination, with a steam-engine or prime motor and a dynamo-electric generator, of a controller comprising an electrically-operated appliance adjusted to respond to predetermined abnormally-heavy currents, and means directly connected with said appliance for reducing the feed of said engine or motor, substantially as described.

13. The combination, with a steam-engine or prime motor and a dynamo-electric generator, of a controller for preventing injury to the dynamo from overloading the same, comprising an electrically-operated appliance adjusted for abnormal heavy currents and arranged in a part of the circuit wherein the current varies with the load on the dynamo, and current-reducing means, such as a feed-valve for said prime motor, connected with said appliance, substantially as described.

14. The combination, with a steam-engine or prime motor and a dynamo-electric generator, of a controller comprising an electrically-operated appliance adjusted for abnormal currents and arranged in a part of the circuit when the current varies with the load on the dynamo and provided with a retractor, and current-reducing means, such as a feed-valve for said prime motor, controlled in both directions by said appliance, so that on the cessation of the abnormal currents the normal conditions are automatically restored, substantially as described.

15. The combination, with a steam-engine or prime motor, dynamo-electric generator, electric circuit, and electrically-propelled vehicle of an electric railway, of a controller comprising an electrically-operated appliance in a part of the circuit when the current varies with the load on the dynamo, provided with a retractor and adjusted for abnormal currents, and current-reducing means, such as a feed-valve for said prime motor, controlled in both directions by said appliance, substantially as described.

16. The combination, with a steam-engine or prime motor, a dynamo-electric generator, an electric circuit, particularly an electric-railway circuit, and electric motors or translating devices in multiple arc in said circuit, particularly the propelling-motors of electrically-propelled vehicles in multiple arc, of a controller comprising an electrically-operated appliance in series with said motors or translating devices, adjusted for abnormal currents and provided with a retractor and current-reducing means, such as a feed-valve for said prime motor, controlled in both directions by said appliance, substantially as described.

17. In combination with a dynamo-electric generator and a prime motor, a controller comprising an electrically-operated appliance provided with a retractor, and current-reducing means, such as a feed-valve for said motor, controlled by said appliance in both directions, and instrumentalities, such as an upright weighted arm, for accelerating the reduction movement of said means, substantially as described.

18. In combination with a dynamo-electric generator and a prime motor, a controller comprising an electrically-operated appliance provided with a retractor, and current-reducing means controlled by said appliance in both directions, and instrumentalities whereby the return movement of said means is more slowly effected than the reduction movement of the same, substantially as described.

19. In combination with a valve, an electro-magnet or solenoid with a movable armature or core connected with said valve, so that the latter may be operated in both directions, and a retractor for said armature or core, and an upright weighted arm connected with said valve and armature or core, substantially as described.

20. The combination, with the prime motor, dynamo-electric governor, circuit, and vehicles of an electric railway, of a controller composed of a normally-open valve in the feed-pipe of said motor, an electro-magnet or solenoid adjusted to close the same when the dynamo becomes overloaded and open it again when the abnormal currents cease, and instrumentalities, such as an upright weighted arm and dash-pot, or either of them, whereby the said valve is caused or allowed to close quickly and open slowly, substantially as described.

21. The combination of a dynamo-electric generator, a driving-engine of nearly the same capacity as said generator, and a controller comprising an electrically-operated appliance in a part of the circuit wherein the current varies with the load on the generator, and current-reducing means connected with said appliance, substantially as described.

In testimony whereof I have signed this specification in the presence of two subscribing witnesses.

SIDNEY H. SHORT.

Witnesses
A. B. CALHOUN,
W. A. PALLANT.